US011663211B2

(12) United States Patent
van der Schyff et al.

(10) Patent No.: US 11,663,211 B2
(45) Date of Patent: May 30, 2023

(54) DATA RETRIEVAL SYSTEMS AND METHODS

(71) Applicants: Atlassian Pty Ltd., Sydney (AU); Atlassian Inc., San Francisco, CA (US)

(72) Inventors: Andre van der Schyff, Sydney (AU); Guido Rota, Woolloomooloo (AU); Matthew Robert Knox, St. Leonards (AU); Thiago Tasca Nunes, St. Leonards (AU); Viktor Krisztian Adam, Jr., Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/037,660

(22) Filed: Sep. 29, 2020

(65) Prior Publication Data

US 2022/0100759 A1 Mar. 31, 2022

(51) Int. Cl.
*G06F 16/2453* (2019.01)
*G06F 16/242* (2019.01)

(52) U.S. Cl.
CPC .... *G06F 16/24537* (2019.01); *G06F 16/2433* (2019.01); *G06F 16/24539* (2019.01)

(58) Field of Classification Search
CPC ......... G06F 16/24537; G06F 16/24539; G06F 16/2433; G06F 16/2425; G06F 16/2448
See application file for complete search history.

(56) References Cited

U.S. PATENT DOCUMENTS

| | | | | |
|---|---|---|---|---|
| 2008/0077557 | A1* | 3/2008 | Schneider | G06F 16/24553 707/E17.14 |
| 2011/0258199 | A1* | 10/2011 | Oliver | G06F 16/24578 707/E17.069 |
| 2015/0193541 | A1* | 7/2015 | Nguyen | G06F 16/2471 707/727 |
| 2016/0378756 | A1* | 12/2016 | Kemp | G06F 16/248 707/722 |
| 2018/0218031 | A1* | 8/2018 | Wong | G06F 16/2425 |
| 2021/0044549 | A1* | 2/2021 | Renjith | H04L 51/214 |

* cited by examiner

*Primary Examiner* — Mark D Featherstone
*Assistant Examiner* — Kweku William Halm
(74) *Attorney, Agent, or Firm* — Brownstein Hyatt Farber Schreck, LLP

(57) ABSTRACT

Described herein is a computer implemented method. The method comprises generating a subscription identifier based on an original SQL query and determining if a set of first stage query results is associated with the subscription identifier in a cache. If so, the method further comprises generating a second stage SQL query based on a second subset of the plurality of clauses and the set of first stage query results, causing execution of the second stage SQL query to obtain a set of second stage query results from a database, and returning the set of second stage query results.

17 Claims, 5 Drawing Sheets

DATA RETRIEVAL SYSTEMS AND METHODS

TECHNICAL FIELD

Aspects of the present disclosure are directed to data retrieval systems and methods.

BACKGROUND

Many computer systems and applications use one or more databases to store data relevant to their operations. Depending on the operations performed by a given system, the load on a database generated by read and/or write requests can be significant.

Background information described in this specification is background information known to the inventors. Reference to this information as background information is not an acknowledgment or suggestion that this background information is prior art or is common general knowledge to a person of ordinary skill in the art.

Figure 1:
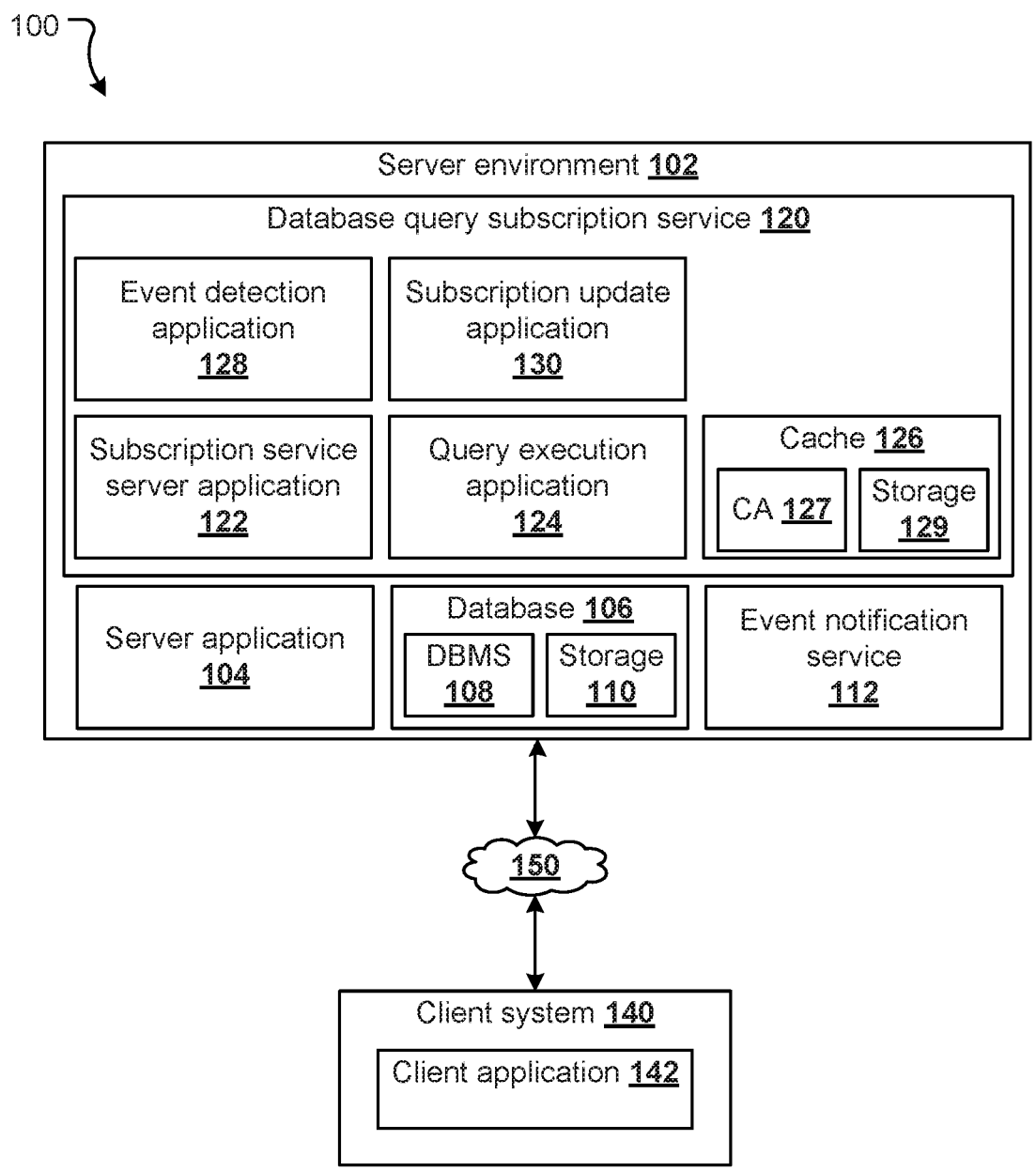
FIG. 1 is a diagram depicting a networked environment in which various features of the present disclosure may be implemented.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As noted above, many computer systems use databases to store data. A common way of storing and retrieving data from a given database is via execution of structured query language (SQL) queries or statements. SQL queries are made up of one or more clauses, and are most commonly used to read and/or write data to from relational databases (that is, databases that make use of a relational data model). SQL queries can, however, also be used with other database models.

In some use cases, a given system's database is queried multiple times using the same or similar queries—e.g. where a query is set to automatically run periodically.

As one example of this, consider an issue tracking system which allows users to create issues and track created issues through an issue lifecycle. For example, a helpdesk or service desk system may allow users to create issues for each new enquiry received. A new issue may be created in an 'open' state, and as the issue is handled it may transition between various states—for example in progress, resolved, closed, reopened. For such a system, database queries to return a list (or queue) of open issues may be set to automatically execute every n seconds in order to return a list of issues meeting defined criteria. The returned list of issues can then be displayed to a user (or otherwise used by a human or program). For example, an 'open issues' query designed to return all open issues assigned to a user or a team (and potentially order such issues by severity/criticality) may be created and set to execute periodically.

As another example, an issue tracking system may allow users to create issues and track issues that relate to tasks in a software development lifecycle. In this case, and by way of example, new tasks (issues) may transition between states such as to do, in progress, ready for quality assurance, done, reopened, and blocked (if the task cannot be completed due to a dependency on another task). In this case, a 'blocked task' query may be created for periodic execution.

The present disclosure provides a mechanism for querying a database that involves processing a SQL query to separate clauses defined therein into what will be referred to as caching type clauses (or caching clauses for short) and non-caching type clauses (or non-caching clauses for short). In this context, the terms caching and non-caching refer to whether results returned by execution of a clause are suitable for caching or not. Caching type and non-caching type clauses are discussed further below. If the query defines at least one caching clause, a subscription for that query is created and results generated by execution of the caching clauses are cached. This can reduce database load for future executions of any query that has the same caching clauses.

It is noted that the techniques described herein may not be appropriate for every single type of SQL query. For example, while one-off queries (i.e. queries that are not re-executed) can be processed using the techniques of the present disclosure (or adaptations thereof), doing so will not provide a benefit from a database load perspective. In contrast, the techniques described herein are particularly suitable for queries which are executed relatively frequently but return data that is changed relatively infrequently.

The techniques and operations described herein can be used (or can be adapted to be used) for queries that use various structured query language syntaxes and/or extensions—e.g. SQL, MySQL, PostgreSQL, Jira Query Language (JQL), Confluence Query Language (CQL), Lucene, Elastic Search, and other structured query language syntaxes and/or extensions.

Turning to FIG. 1, one example of a networked environment 100 in which the various operations and techniques described herein can be performed will be described.

Networked environment 100 includes a server environment 104 which communicates with a client system 140 via one or more communications networks 150 (e.g. the Internet). While only one client system 140 is depicted, server environment 104 will typically serve multiple client systems.

Server environment 102 may be a system or set of systems configured to provide any type of service/perform any type of operations for clients. In order to provide such services/operations, server environment 102 stores data in a database 106. As one example, server environment 102 may be an issue tracking system used (inter alia) to create, manage, and track issues. Server environment 102 may, however, provide other services/perform other operations.

In the present example, server environment includes a server application 104, a database 106, an event notification service 108, and a query subscription service 120 (also referred to as subscription service 120 for short).

Server application 104 is executed by a computer processing system to configure that system to provide server-side functionality to one or more corresponding client applications (e.g. client application 142 as discussed below). Server application 104 comprises one or more application programs, libraries, APIs or other software elements that implement the features and functions that are described herein. For example, where the client application 142 is a web browser, the server application 104 will be a web server such as Apache, IIS, nginx, GWS, or an alternative web server. Where the client application 142 is a specific/native application, server application 102 will be an application server configured specifically to interact with that client application 142.

Server system 104 may be provided with both web server and application server applications.

Server environment 102 also includes a database 106. Database 106 includes one or more database management systems (DBMS) 108 and one or more data storage systems 110 (operating on one or multiple computer processing systems). Generally speaking, DBMS 108 receives structured query language (SQL) queries from a given application (e.g. server application 104, query execution application 124, or an alternative application), interacts with database storage 110 to read/write data as required by those queries, and responds to the relevant application with results of the query.

Database 106 may store any data relevant to the services provided/operations performed by the server environment 102. In the present examples, such data includes data objects (or, in some cases, objects for short). In this context, a data object is a logical grouping of data. Data for a data object may be stored across multiple database records (e.g. across multiple database tables) that are related to one another by one or more database keys (for example object identifiers and/or other identifiers).

By way of specific example, where server environment 102 is an issue tracking system, data objects may related to issues that are maintained and managed by the system. In this case, various data can be maintained in respect of a given issue, for example: an issue identifier; an issue state; a team or individual to which the issue has been assigned; an issue description; an issue severity; a service level agreement associated with the issue; a tenant to which the issue relates; an identifier of a creator of the issue; a project to which the issue relates; identifiers of one or more issues that the issue is dependent on; identifiers of one or more issues that depend on the issue; identifiers of one or more other stakeholders; and/or other data.

Server environment 102 also includes an event notification service 112. In this particular example, event notification service 112 is a publication/subscription service that publishes events that occur at database 106 (for example object creation, object deletion, object update, and/or other events).

In the present embodiments, subscription service 120 includes a subscription service server application 122, a query execution application 124, subscription service cache 126, an event detection application 128, and a subscription update application 130. While these have been described as separate applications they may be implemented as a single application and/or may run on one or multiple computer processing systems.

Subscription service server application 122 is an application configured to receive, process, and ultimately respond to SQL queries that are intended for execution by database 106. As described below, such queries may be received from server application 104, a client application such as 142, or an alternative application.

Query execution application 124 is an application configured to execute queries on database 106 (e.g. by interaction with DBMS 108).

Subscription service cache 126 is a data store that stores data in respect of subscriptions created by the subscription service 120. Cache 126 will typically comprise a cache application 127 that writes data to/retrieves data from cache storage 129 (cache storage 129 being distinct to database storage 110). In the described embodiments, cache 126 is an in-memory data store such as Redis, Memcached, or an alternative in-memory data store. While in-memory data stores typically have an advantage of being relatively fast, cache 126 could alternatively be implemented in a persistent data store (for example another relational database or other persistent data store). Relevantly, however, in order to prevent additional load on the main database 106 cache 126 is separate to the main database 106.

The present disclosure describes writing data to and reading data from (querying) cache 126. Such operations involve writing data to or reading data from cache storage 129 via the cache application 127.

Event detection application 128 detects events that occur at database 106 (and/or, in some cases, other applications or systems), for example by subscribing to event notification service 112.

Subscription update application 130 invalidates data (e.g. by flagging them as stale) stored in the cache 126 based on events detected by the event detection application 128.

Where they are separate applications, the subscription services applications (122, 124, 126, 128, and 130) may communicate via any appropriate mechanisms. For example, applications 122, 124, 126, 128, and 130 may be connected to and communicate via a private network (e.g. a LAN), a public network (e.g. the Internet), a virtual private network (e.g. a VLAN making use of the Internet), and/or directed wired or wireless connections.

Similarly, server application 104, database 106, and event notification service 112 may communicate with one another (and the subscription service 120/subscription service applications) by any appropriate mechanisms (private network, public network, virtual private network, direct wired/wireless connections).

In certain embodiments, server environment 102 is a multi-tenanted system: i.e. server application 104 (and/or subscription service server application 122) serves multiple tenants. In these embodiments, any request received by the server environment is associated with a particular tenant—e.g. via a tenant identifier. For example, a given request may be received from/initiated by a particular account, and the identifier for that account will be associated with a tenant identifier.

The applications of server environment 102 will typically run on multiple computer processing systems. For example, in some implementations each component of the server environment 102 may run on a separate computer processing system. In other embodiments, multiple (or even all) components of the server environment 102 may run on a single computer processing system. In certain cases a clustered server architecture may be used where applications are executed across multiple computing instances (or nodes) that are commissioned/decommissioned on one or more computer processing systems to meet system demand.

Client system 140 hosts a client application 142 which, when executed by the client system 140, configures the client system 140 to provide client-side functionality. This may include, for example, interacting with (i.e. sending data to and receiving data from) server application 104 and/or subscription service server application 122. Such interactions typically involve logging on (or otherwise accessing) server application 104 or 122 by providing credentials for a valid account maintained by the server environment 102. As noted above, in certain embodiments the account may be associated with a particular tenant identifier. Once validated, a user can perform various functions using client application 142, for example generating requests to read data from or write data to database 106, automating such requests (e.g. setting requests to periodically execute at certain times), and other functions.

Client application 142 may be a general web browser application (such as Chrome, Safari, Internet Explorer, Opera, or an alternative web browser application) which accesses a server application such as 104 or 122 via an appropriate uniform resource locator (URL) and communicates with the server application via general world-wide-web protocols (e.g. http, https, ftp). Alternatively, client application 142 may be a specific/native application programmed to communicate with a server application using defined application programming interface (API) calls.

A given client system 140 may have more than one client application 142, for example both a general web browser application and a dedicated programmatic client application.

Client system 140 may be any computer processing system which is configured (or configurable) by hardware and/or software to offer client-side functionality. By way of example, suitable client systems may include: server computer systems, desktop computers, laptop computers, netbook computers, tablet computing devices, mobile/smart phones, and/or other computer processing systems.

The client system 140 and server environment 102 (or applications of the server environment 102) communicate data between each other either directly or indirectly through one or more communications networks 150. Communications network 159 may comprise a local area network (LAN), a public network, or a combination of networks.

The embodiments and features of the present disclosure are implemented using one or more computer processing systems. For example, client system 140 is a computer processing system and server environment 102 includes various applications and components that are provided by one or more computer processing systems.

Figure 2:
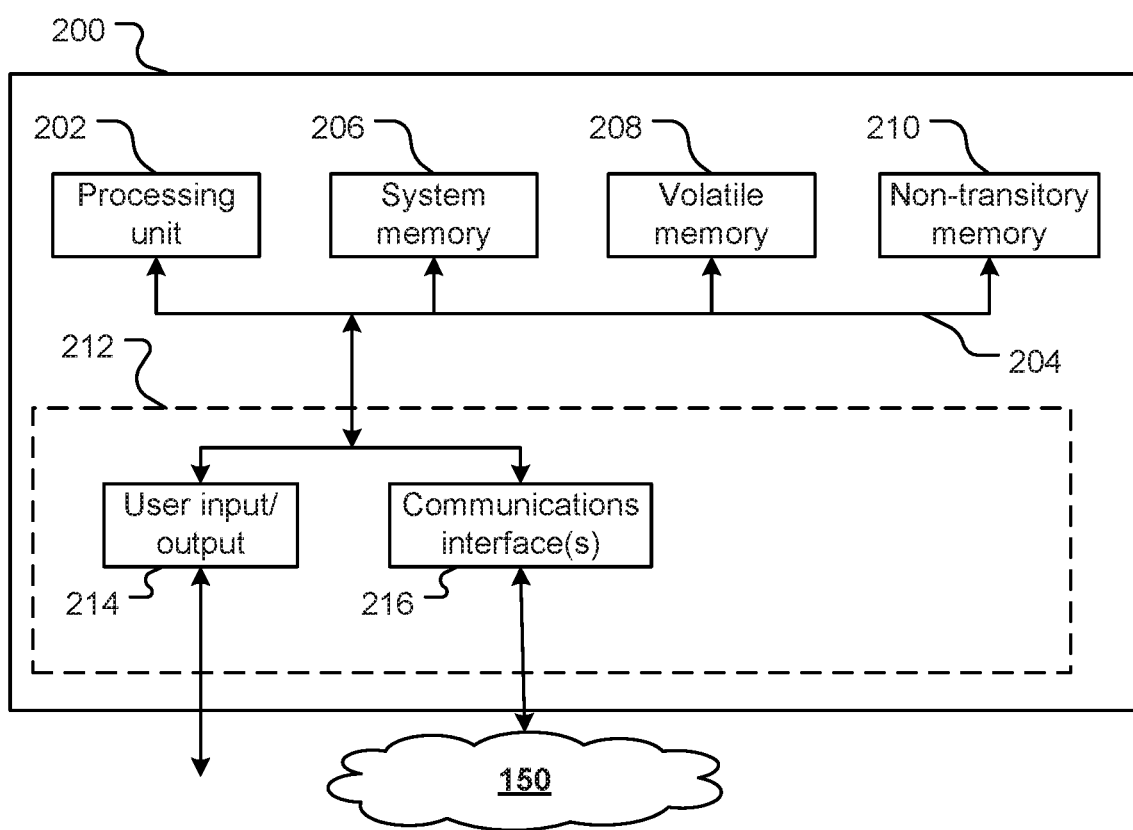
FIG. 2 is a block diagram of a computer processing system configurable to perform various features of the present disclosure.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202—for example a general or central processing unit, a graphics processing unit, or an alternative computational device). Computer processing system 200 may include a plurality of computer processing units. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204, processing unit 202 is in data communication with a one or more computer readable storage devices which store instructions and/or data for controlling operation of the processing system 200. In this example system 200 includes a system memory 206 (e.g. a BIOS), volatile memory 208 (e.g. random access memory such as one or more DRAM applications), and non-volatile (or non-transitory) memory 210 (e.g. one or more hard disks, solid state drives, or other non-transitory computer readable media). Such memory devices may also be referred to as computer readable storage media (or a computer readable medium).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol.

Wireless connection with other devices/networks may similarly be by any appropriate standard or proprietary hardware and communications protocols, for example infrared, BlueTooth, WiFi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol.

Generally speaking, and depending on the particular system in question, devices to which system 200 connects—whether by wired or wireless means—include one or more input/output devices (indicated generally by input/output device interface 214). Input devices are used to input data into system 200 for processing by the processing unit 202. Output devices allow data to be output by system 200. Example input/output devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads (and/or other touch/contact sensing devices, including touch screen displays), microphones, accelerometers, proximity sensors, GPS devices, touch sensors, and/or other input devices. System 200 may also include or connect to one or more output devices controlled by system 200 to output information. Such output devices may include devices such as displays (e.g. cathode ray tube displays, liquid crystal displays, light emitting diode displays, plasma displays, touch screen displays), speakers, vibration applications, light emitting diodes/other lights, and other output devices. System 200 may also include or connect to devices which may act as both input and output devices, for example memory devices/computer readable media (e.g. hard drives, solid state drives, disk drives, compact flash cards, SD cards, and other memory/computer readable media devices) which system 200 can read data from and/or write data to, and touch screen displays which can both display (output) data and receive touch signals (input).

System 200 also includes one or more communications interfaces 216 for communication with a network, such as network 150 of environment 100. Via a communications interface 216 system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transitory computer readable media accessible to system 200. For example, instructions and data may be stored on non-transitory memory 210. Instructions and data may be transmitted to/received by system 200 via a data signal in a transmission channel enabled (for example) by a wired or wireless network connection over interface such as 212.

Applications accessible to system 200 will typically include an operating system application such as Microsoft Windows™, Apple macOS™, Apple iOS™, Android™, Unix™, or Linux™.

System 200 also stores or has access to applications which, when executed by the processing unit 202, configure system 200 to perform various computer-implemented processing operations described herein. For example, and referring to networked environment 100 of FIG. 1 above, client system 140 includes a client application 142 which configures the client system 140 to perform client system operations, and server environment 102 includes server applications 104 and/or 122 which configure the server environment computer processing system(s) to perform the described server environment operations.

In some cases part or all of a given computer-implemented method will be performed by a single computer processing system 200, while in other cases processing may be performed by multiple computer processing systems in data communication with each other.

In the present disclosure, a SQL query that includes one or more caching type clauses causes creation of what will be referred to as a SQL query subscription. In the present embodiments, SQL query subscriptions (or data in respect thereof) are stored by the subscription service cache 126.

Cache 126 may be implemented in various ways. In the present embodiments, cache 126 is an in-memory key-value data store. In these embodiments, the key-value pairs (which will also be referred to as cache records) available for a given subscription include:

| Key | Value |
|---|---|
| SID_objectIds | A set (or list) of object identifiers. |
| SID_objectLimit | A value (e.g. a string) indicating that the number of objects for the subscription exceeds a maximum number of objects. |
| SID_metadata | A value (e.g. a string) storing metadata associated with the subscription. |
| SID_version | A value (e.g. a string) indicating a version of the subscription. |
| SID_stale | A value (e.g. a string) indicating whether the subscription is current or stale. |
| SID_updating | A value (e.g. a string) indicating whether the subscription is currently being updated. |

In this particular example, metadata relating to a subscription can be stored (via the SID_metadata key). Such metadata may be used when determining whether an event could relate to the subscription or not (see process 500 described below). In this case, any appropriate metadata may be used. As one example, in the context of an issue tracking system (where the database objects in question are issues), issues may be associated with particular projects (e.g. via the use of project identifiers). In this case, the metadata key-value pair may be used to store a project identifier that is associated with an original query to which the subscription relates. Other values may also (or alternatively) be stored using the metadata key-value pair.

In this particular example, a version may be stored for a subscription (via the SID_version key). The version may be used to determine whether the object identifiers (stored in this case using the SID_objectIds key-value pair) have changed since a query the subscription relates to was previously run. The version identifier may, for example, be a UID that is generated and stored each time a subscription is updated.

Key/value pairs (or other record types depending on the nature of the cache) may be created to store any other useful data in the cache. In this sense, useful object data is data that may be used to assist in determining whether an event could potentially match (or does actually match) a subscription (as discussed further below). For example, data such as an object type, an object status, and or any other object data may be stored (for example against a SID_objectType or SID_objectStatus key respectively). In the context of an issue tracking system where database objects are issues, object types may be types such as task, subtask, epic, bug, story, change, and/or other types.

In this particular example, no timestamp/time-to-live data is explicitly stored for a subscription. Rather, values stored in the SS storage are associated with an expiry time. By way of example, where SS storage is implemented using Redis values can be set to expire using the 'EX' (or 'PX') option when setting a key's value. In alternative implementations, an explicit time-to-live or expiry value may be stored.

In this example, the key of each key-value pair includes (in this case is pre-pended with) a subscription identifier—referenced as SID in the above table—which uniquely identifies a particular subscription. In the embodiments described herein, the subscription identifier may include a tenant identifier portion and a query identifier portion. Generation of the subscription identifier is described further below with reference to operation 324 of process 300.

Additional and alternative key-value pairs are possible and may be appropriate depending on the type of objects in question. In one particular implementation Redis is used to implement cache 126, and in the following description example Redis commands are provided for writing data to and retrieving data from the cache 126. Alternative data stores (with alternative read/write commands and/or data types) are possible.

Figure 3:
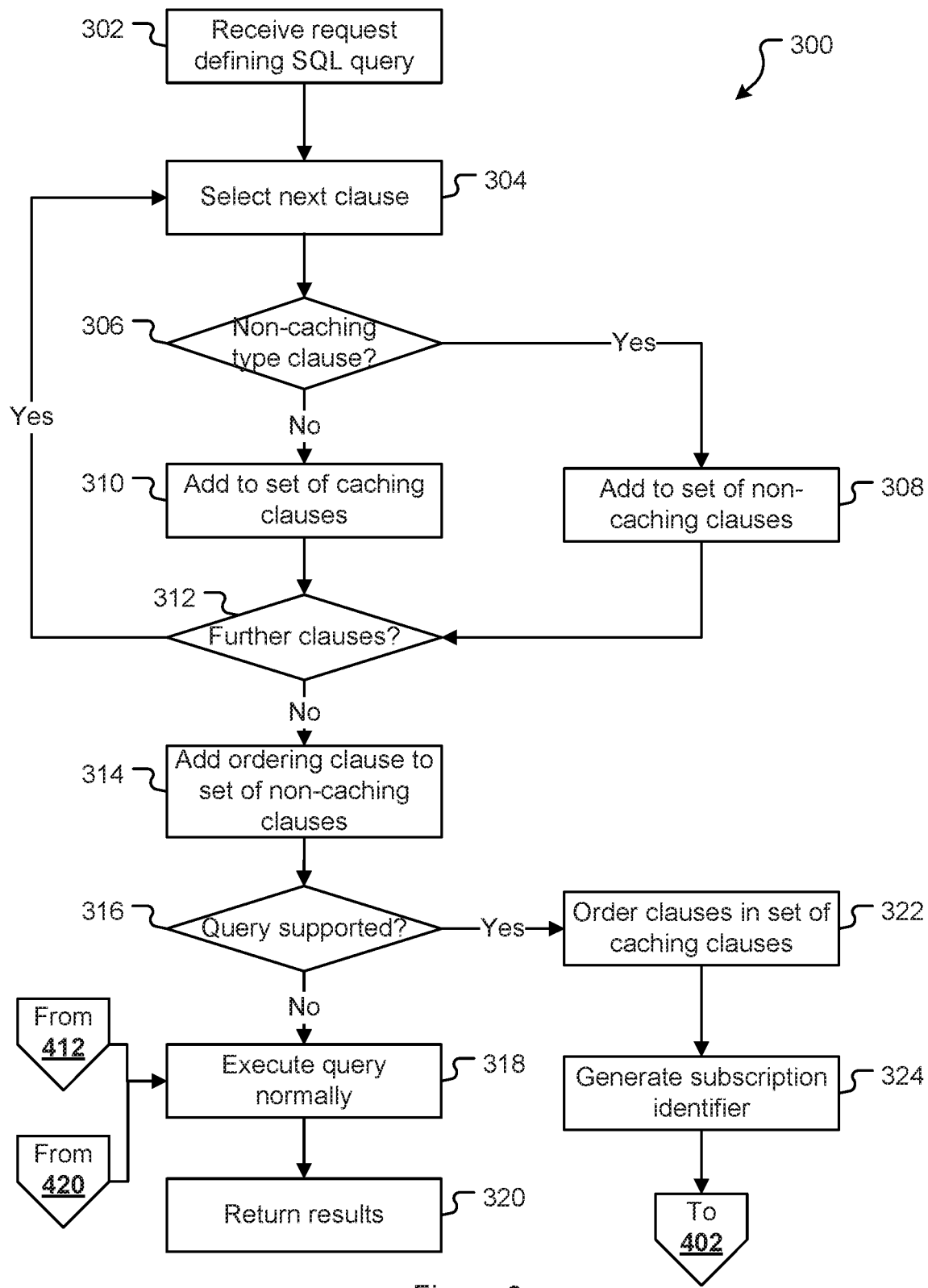
FIGS. 3 and 4 depict operations involved in processing a structured query language query.
Figure 4:
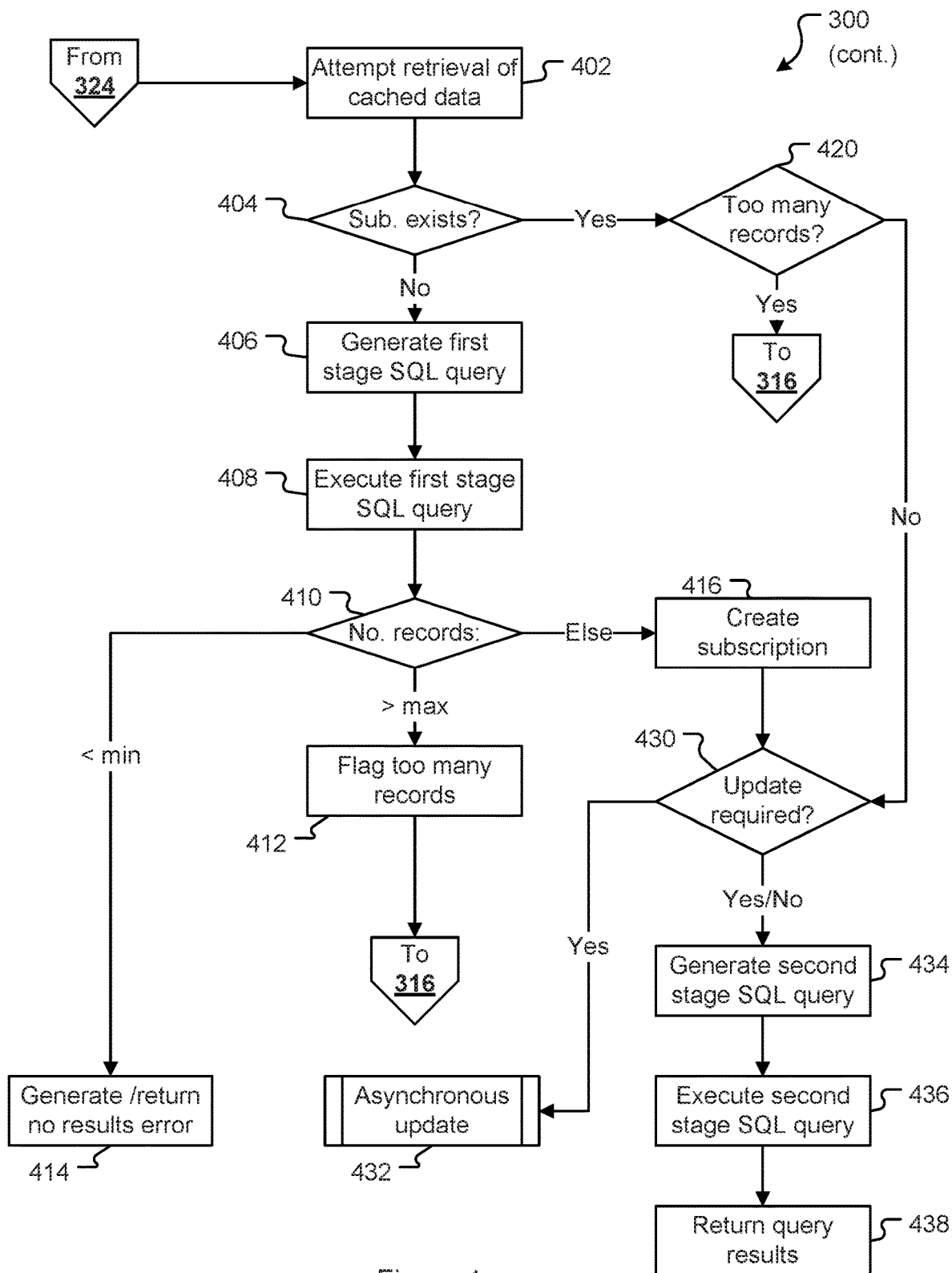

Turning to FIGS. 3 and 4, a process 300 for processing a SQL query will be described.

In this example, the operations of process 300 are generally performed by the subscription service 120. Although in some cases operations are described as being performed by a certain application of the SS 120 (e.g. the subscription service server application 122 or query execution application 124), in many cases such operations could be performed by alternative applications or applications (running on a single or multiple systems).

In this section, the subscription service server application 122 will be referred to as application 122.

At 302, application 122 receives a request from a client. The request defines a structured query language (SQL) query (e.g. a string) that is made up of one or more clauses. The request may be a database request that includes the SQL query. Alternatively, the request may include data that causes a SQL query to be generated or references a previously saved SQL query that can be retrieved (from environment 102 or elsewhere). The query defined by the request received at 302 will be referred to as the original query.

In certain embodiments, the request is associated additional data. For example, the request may be is associated with an account identifier that identifies an account (e.g. an account that is responsible for the request being made or that the request is to be executed on behalf of). Where SS 120 provides services to multiple tenants, the request may also be associated with a tenant identifier (identifying a tenant that the account is associated with).

Application 122 may receive a request from various systems or applications. For example, the request may be received from: an end user client application (such as client application 142); a server application (such as 104) that has received a request from a client application (such as client application 142) and passes the query request to the SS endpoint 122 for execution; a server application (such as 104) that has been programmed to automatically generate the request; a scheduling system/application which is configured to periodically execute defined queries; an alternative system or application (under human or programmatic control).

At 304, application 122 processes the original query to select the next clause to be processed. In the present embodiment, application 122 processes clauses in the order they appear in the original query. Initially, therefore, application 122 selects the first clause in the original query.

At 306, application 122 determines a type of the currently selected clause. If the clause is determined to be a non-caching type clause, processing proceeds to 308. Otherwise, the clause is determined to be a caching type clause and processing proceeds to 310.

In the present embodiment, application 122 determines that a clause is a non-caching type clause if it is a dynamic clause, a sensitive clause, or an ordering clause.

In the present embodiments, a dynamic clause is a clause that relies on data that is external to the clause itself for execution. One example of a dynamic clause is a clause that includes a user-dependent function (for example a function such as "currentUser( )"). Execution of a clause with such a function depends on which user account execution of the SQL query is associated with.

Another example of a dynamic clause is a clause that includes a temporal function (for example a function such as "breached( )", "elapsed( )", "now( )" in the JQL context). Execution of such a clause depends on the time of execution.

Another example of a dynamic clause is a clause that references a saved filter (for example a function such as "filter="My Saved Filter"") and, therefore, could change if the saved filter changes.

An example of a dynamic clause (again using JQL as the example language) is "project=FOO order by sla". This clause is dynamic because the value of sla (service level agreement) is temporal (it depends on when the query is executed) and the order by is dynamic because it changes with the fields contained in it.

In the present embodiments, a sensitive clause is a clause that references a database field which can have its own permission scheme (separate to the general database permission scheme) defined. For example, the database may support certain fields—e.g. a comments field or the like—and allow users to apply read/write permissions to that field that are separate/additional to other database permission schemes. For example, a given object (or group of objects) may have overarching permissions applied that restrict reading (and/or writing) the object to particular users/user types. Such an object may also have a text field (e.g. a 'comments' field) which has been further restricted to defined users. In this case a given user may have permission to view the object but may not have permission to view the comments field of the object.

In the present embodiments, an ordering clause is a clause that impacts the order of returned results but not the results themselves (e.g. a clause that invokes an 'ORDER BY' function or the like).

Accordingly, application 122 may determine that a clause is a non-caching type clause by determining if the clause includes any words that are included in a non-caching keyword list (and, if so, the clause is determined to be a non-caching clause). A single non-caching keyword list may be maintained. Alternatively, multiple non-caching keyword lists may be maintained, for example: a dynamic keyword list (defining the names of any functions which, if present in a clause, will result in a determination that the clause is non-caching); and a sensitive keyword list (defining the names of any specific sensitive fields and/or field types (e.g. any text fields) which, if present in a clause, will result in a determination that the clause is non-caching).

At 308, application 122 has determined the selected clause to be a non-caching type clause. In this case, application 122 adds the selected clause to a set of non-caching clauses (also referred to as a second subset of clauses). Processing then proceeds to 312.

If, at 306, application 122 does not determine a clause to be a non-caching type clause, application 122 determines that clause to be a caching type clause and processing proceeds to 310.

At 310, application 122 adds the selected clause to a set of caching clauses (also referred to as a first subset of clauses). Processing then proceeds to 312.

As will be appreciated, the set of caching clauses (or first subset of clauses) is different to the set of non-caching clauses (or second subset of clauses).

At 312, application 122 determines whether there are any unprocessed clauses in the original query. If so, processing returns to 304 to select the next unprocessed clause in the original query. If all clauses have been processed, processing continues to 314.

Depending on the particular structured query language in question, certain parts of the original SQL query may either be added to both the set of caching clauses and the set of non-caching clauses or otherwise flagged for inclusion in both the first stage and second stage SQL queries (discussed below). For example, in the SQL context the SELECT operation (e.g. SELECT [field(s)] FROM [table(s)]) is, ultimately, included in both the first stage SQL query and the second stage SQL query. Any other language specific constructs which must be present to make a valid query will also be included in both the first and second stage queries.

At 314, application 122 adds an ordering clause (e.g. a clause defining an ORDER BY operation) to the set of non-caching clauses. If the original query included an ordering clause, this clause is added to the set of non-caching clauses. If not, in certain embodiments application 122 is configured to generate a predefined ordering clause and add this to the set of non-caching clauses. By way of example, the default ordering clause may be a clause such as "ORDER BY<objectId> ASC", which will order results in ascending order according to the objectId field). In other embodiments, if the original query does not itself include an ordering clause this will be taken as an indication that the order of the results returned by a query is not important and no ordering clause is added to the set of non-caching clauses.

At 316, application 122 determines if the original query received at 302 is supported for cached execution. If the set of caching clauses is empty, application 122 determines that the original query is not supported for cached execution and processing proceeds to 318. If the set of caching clauses is not empty, application 122 determines that the original query is supported for cached execution and processing proceeds to 320.

At 318, application 122 has determined that the original query is not supported for cached execution. In this case, application 122 causes the original query to be executed normally. This may involve, for example, passing the original query to query execution application 124 which executes the original query on database 106 and returns the original query results to application 122.

At 320, application 122 then returns the results of the SQL query execution performed to the relevant application—for example the application from which the request was received at 302. Process 300 then ends.

At 322, application 122 has determined the original query is supported for cached execution.

At 322, application 122 orders the clauses in the set of caching clauses. This is done so when a hash calculated based on the set of caching clauses (see 324 below), all sets of caching clauses that include the same clauses will generate the same hash value. Clauses in the set of caching clauses may be ordered in any way that generates a consistent result—for example lexicographic ordering based on the text of the clauses.

At 324, application 122 generates a subscription identifier for the original query in question (e.g. the SID term of the keys in the example key/value pairs described above).

Where SS 120 serves a single tenant (or otherwise has no need to distinguish between tenants), application 122 may generate the subscription identifier to include a query identifying portion only. To do so, application 122 calculates a hash of the set of cacheable clauses (as ordered at 322). E.g. subscription identifier=<hash value>. Any appropriate hash function may be used, for example a non-cryptographic hash function (such as MurmurHash), a secure hash function (such as SHA-1), a message digest hash function (such as MD5) or any other suitable hash function.

Where tenant information is relevant, application 122 may generate the subscription identifier to include both a tenant identifier portion and a query identifier portion. The query identifier portion may be generated as above. The tenant identifier portion may be the tenant identifier (or a value from which the tenant identifier can be determined). In this case, the subscription identifier may, for example, take a form such as "<tenantId>:<hash value>". In this example a colon character has been used to separate the tenant identifier from the hash but any character could be used.

It is noted that a given subscription identifier may match different original queries. Specifically, and where tenant identifiers form part of the subscription identifier, any original query that is associated with the same tenant and generates the same set of caching clauses will (regardless of non-caching clauses) result in the same subscription identifier being generated.

Following generation of the subscription identifier, processing continues to 402 (FIG. 4).

At 402, application 122 generates and executes a cache query (i.e. a query of cache 126) to attempt to retrieve cached data that is relevant to the query received at 302. In the present embodiment, this involves generating and executing a cache query using the subscription identifier generated at 324.

With the particular key-value pairs described above, at 402 application 122 may generate/execute a cache query to retrieve data stored against the SID_objectIds key—e.g. [GET SID_objectIds]. An alternative key could, however, be queried.

At 404, application 122 determines if a subscription that is relevant to the original query received at 302 exists (or, more particularly, if a subscription that is associated with the caching clauses of the original query exists). If no data, or a value (e.g. '(nil)' indicating the key does not exist) is returned from the cache query executed at 402, application 122 determines that no relevant subscription exists and processing proceeds to 408. Otherwise, processing proceeds to 420.

At 406, application 122 generates a first stage SQL query (i.e. a query that is to be executed on database 106). The first stage SQL query is based on the clauses in the set of caching clauses (or the first subset), along with any other parts of the original SQL query that are required (for example a SELECT operation in the SQL context). The first stage SQL query is generated so as to only return identifiers of objects that match the query clauses (and not other object data).

In the present example, the first stage SQL query is generated so as to be executed without permissions. This is to allow future queries (as received at 302) to make use of the subscription/cached data even if they have different permissions. As discussed below, permissions are taken into account on execution of a second stage SQL query (see 436).

In the present example, the first stage SQL query is also generated to be executed without any particular/explicitly defined ordering. This is to account for the fact that any ordering required by the original SQL query will be handled in the second stage SQL query (see 436).

At 408, application 122 causes the first stage SQL query to be executed. In the present embodiment, application 122 passes the first stage SQL query to the query execution application 124 which, in turn, interfaces with database 106 (and in particular DBMS 108) to execute the query, receive a set of first stage query results, and pass the first stage query results (a set of zero or more object identifiers) back to application 122.

At 410, application 122 determines whether the number of results in the set of first stage query results (e.g. the number of object identifiers) is within a defined acceptable result number range. The acceptable result number range may be defined by a minimum number of results and a maximum number of results. In the present embodiments, the minimum number of results defined is 1—i.e. a first stage SQL query that does not return any results will not fall within the acceptable result number. The maximum number of results may similarly be defined to be any appropriate number (for example 5000, 10000, 20000, or an alternative maximum number of results). The maximum number may be determined based on the storage and memory requirements on the cache 126 and application server.

If, at 410, the number of results returned is greater than the defined maximum, processing proceeds to 412. At 412, application 122 flags that the original query exceeds the maximum number of objects in the cache 126. Continuing the example above, this may be done by, for example, stored a defined value against the SID_objectIds key—e.g. [SET SID_objectLimit ">Max" EX n] (n being a selected expiry value). Processing then proceeds to 318 where the original query is executed normally on database 106.

If, at 410, the number of results returned is less than the defined minimum (e.g. zero results are returned), processing proceeds to 414. In this particular example when zero results are returned application 122 returns this (e.g. an empty result set or other value indicating no results were returned) to the appropriate client/application. In certain embodiments, process 300 ends 414 without creating a subscription for the query.

In other embodiments, after returning no results at 414, application 122 proceeds to create a subscription for the query (e.g. as per operation 416 described below), however after creating the subscription does not proceed to check whether an update is required (e.g. 430) or generate and execute a second stage query (per 434/436).

If, at 410, the number of results returned is within the acceptable result number range (i.e. min<no. results<max in this example) processing proceeds to 416. At 416, application 122 creates a subscription by generating and stores subscription data in respect of the original query received at 302 in the cache 126.

Continuing with the example key-value pairs described above, in order to create the subscription application 122 may generate and execute a set of commands such as the following to create cache records in respect of the subscription:

| Command |
| --- |
| SET SID_objectIds <list/set of object identifiers returned by first stage SQL query> EX n |
| SET SID_metadata <record of any meta data> EX n |
| SET SID_version <new UID> EX n |
| SET SID_stale "False" EX n |
| SET SID_updating "False" EX n |

Any suitable expiry (n) can be used, suitability depending on the application in question. As one example, n may be set to 2 minutes.

Following creation of the subscription at 416, processing proceeds to 430.

If, at 404, application 122 determines that a subscription relevant to the original query received at 302 exists, processing proceeds to 420. At 420, application 122 determines if the subscription returns too many objects (e.g., continuing the above example, if querying the SID_objectLimit key returns a value such as ">Max"). If so, processing proceeds to 318 where the original query is executed normally on database 106.

If, at 420, the data returned by the attempted retrieval at 402 does not indicate that the subscription returns too many objects processing proceeds to 430.

At 430, application 122 determines if the subscription that the original query relates to requires updating. If, at 430, application 122 determines that updating is required processing proceeds to 432. If, at 430, application 122 determines that no update is required processing proceeds to 434.

In the present embodiment, determining whether a subscription requires updating involves determining whether the subscription is stale (e.g. by reference to a 'stale' flag/variable) or whether the subscription has expired (e.g. by reference to a time-to-live (TTL) value stored in or associated with a subscription record). Application 122 determines that the subscription requires updating if it is stale or it has expired.

In this example, application 122 checks the state of the stale flag/variable by querying cache 126—e.g. by a query such as [GET SID_stale]. If a value indicating the subscription is stale is returned (e.g. 'true') the subscription is determined to be stale.

In the present example, application 122 checks whether the subscription has expired by checking the TTL of a record associated with the subscription. For example, to determine whether the subscription has expired application 122 may determine whether the set of first stage query results has expired—for example by a query such as [TTL SID_objectIds] (which returns a time to live value in seconds).

If the subscription is stale or has expired, application 122 determines that the subscription requires updating and processing proceeds to 432. At 432 an asynchronous update 432 is triggered. In this example, asynchronous update 432 involves: re-executing the first stage SQL query for the original query (e.g. per 408 described above); if the number of objects returned is within range, storing the object identifiers returned by the first stage SQL query in cache 126 (e.g. per 416 described above); if the number of objects returned by the first stage SQL query exceeds the defined maximum, storing a value indicating this (e.g. per 412 described above).

In certain embodiments, even if an update is determined to be required processing proceeds to 434 in parallel to the asynchronous update being triggered/performed. This may (though will not necessarily) result in an outdated set of object identifiers being returned/used to respond to the original SQL query (for example if one or more objects should have been added to or removed from the set of object identifiers for the subscription in question). This approach will be appropriate where a relatively fast return of potentially stale data is preferable to a relatively slow return of consistent, up to date data. One example of such a query is a periodic query that is executed to list currently pending support tickets/issues.

In alternative embodiments, if an updated is determined to be required at 430 processing does not continue to 434 until that update has been performed. This approach will be appropriate where a relatively slow return of consistent, up to date data is preferable to a relatively fast return of potentially stale data.

In still further alternative embodiments, if an update is determined to be required at 430 application 122 may return to 318 to execute the original query normally (i.e. in addition to triggering the asynchronous update process).

At 434, application 122 generates a second stage SQL query. The second stage SQL query is generated using the object identifiers for the subscription (either as returned by execution of the first stage SQL query at 408 or as returned from the cache 126 at 402), the non-caching clauses (or second subset) of the original query (added to the set of non-caching clauses at 308 and including the ordering clause added at 320), and any other parts of the original SQL query that are required (for example a SELECT operation in the SQL context). The second stage SQL query is generated to search only across the object identifiers for the subscription.

In certain embodiments, the second stage SQL query is generated so as to only return identifiers of objects that match the query clauses (and not other object data). This allows for an alternative application or service, which has potentially been optimised to return specific data based on object identifiers, to retrieve object data other than identifiers that has been requested in the original SQL query.

In alternative embodiments, the second stage SQL query is generated to return all data requested in the original SQL query.

At 436, application 122 causes the second stage SQL query to be executed. In the present embodiment, application 122 passes the second stage SQL query to the query execution application 124 which, in turn, interfaces with database 106 to run the query, receive a set of second stage query results, and pass the set of second stage query results back to application 122.

The second stage SQL query is executed taking permissions into account (e.g. based on the account identifier of the account associated with the original request).

At 438, the set of second stage query results are returned to the relevant application—for example the application from which the request was received at 302. Process 300 then ends.

Where the second stage SQL query is generated to only return object identifiers, any additional object data requested in the original query will need to be retrieved. With knowledge of the relevant object identifiers, however, the cost of such a query (in a database load sense) is much cheaper. Obtaining any additional object data required may be performed by any appropriate application—for example by application 122 (via query execution application 124), by the requesting application (e.g. a client application 142), by an intermediate server application such as server application 122, or by an alternative application.

Figure 5:
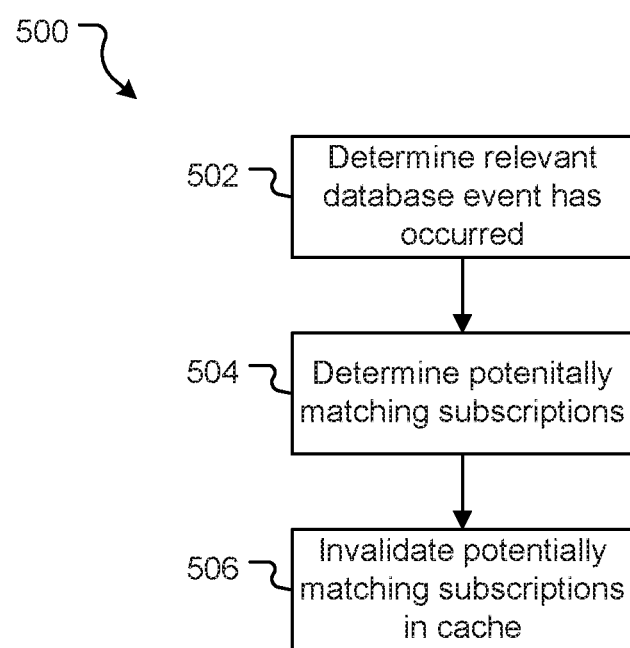
FIG. 5 depicts operations involved in invalidating a subscription.

At 430 of process 300 above, application 302 determines if a subscription has been flagged as stale. In certain embodiments subscriptions are flagged as stale based on events occurring with respect to data maintained by database 106. Turning to FIG. 5, an example process 500 by which subscriptions are flagged as stale will be described.

In this example, the operations of process 500 are again generally performed by the subscription service 120. Although certain operations are described as being performed by certain applications of the SS 120 (e.g. event detection application 128 and subscription update application 130), in many cases such operations could be performed by alternative applications or applications (running on a single or multiple systems). For example, the operations of process 500 could be performed by application 122.

At 502, event detection application 128 determines that a relevant event has occurred. Generally speaking, a relevant event is one that could potentially impact the object identifiers that have been stored in cache 126 for a given subscription. In the present example, relevant events include database events such as: new objects being added to database 106 (new objects which should potentially be added to one or more subscriptions); existing objects being deleted from database 106 (objects which potentially need to be removed from one or more subscriptions); and existing objects being updated at database 106 (such updates potentially leading to objects needing to be added or removed from one or more subscriptions). Relevant events may also include non-database events. For example, an event may be a change of user name which does not originate from database 106 yet may still impact subscriptions.

Event detection application 128 may be configured to determine that a relevant event has occurred in various ways.

In certain embodiments, event detection application 128 subscribes to a publication/subscription type service to watch for relevant events being published there on. When an event of a relevant type is published (e.g. an issue created event, an issue deleted event, an issue updated event, or an alternative relevant event), event detection application 128 determines that a relevant database event has occurred. In this case, database events may be published by an application such as the event notification service 108.

Alternatively, event detection application 128 may be configured to periodically querying the database 106 (or an alternative application) to determine if any relevant events have occurred. Further alternatively, an application such as the event notification service 108 may be configured to notify the event detection application 128 directly when a relevant event occurs.

Determining that a relevant database event has occurred may also involve receiving (or retrieving) information regarding that event. As one example, an event may be associated with a particular tenant identifier which is received with or retrieved following determination that the event has occurred (for example, the event may be published with the associated tenant identifier on the publication/subscription service). As another example an event may be associated with one or more alternative types of identifiers—for example a project identifier and/or other identifiers—which are received with/retrieved based on the event.

At 504, event detection application 128 determines subscriptions that potentially match the event that has been determined to occur at 502. This determination may be made in various ways.

For example, where subscription service 120 serves multiple tenants and associates each subscription with a tenant, event detection application 128 may determine potentially matching subscriptions based on a tenant identifier associated with the event. In the above context, this can be done based on the tenant identifier portion of the subscription identifier, for example by matching on a prefix of the subscription keys (e.g. using a function such as "KEYS <pattern>" in the Redis context).

As another example, where a project (or alternative) identifier is relevant and maintained (e.g. in subscription metadata or an alternative subscription field), event detection application 128 may determine potentially matching subscriptions based on a project (or alternative) identifier associated with the event. In the above context, this can be done based on the metadata key-value pair. A project (or alternative) identifier may be used to identify matching subscriptions in addition to a tenant identifier (where tenant identifiers are available).

At 506, event detection application 128 causes the potentially matching subscriptions identified at 504 to be flagged as stale (i.e. invalidated). In the present example, event detection application 128 does so by passing a list or other record of potentially matching subscriptions to the subscription update application 130 which, in turn, invalidates the subscription data maintained in cache 126.

In the present embodiment, the subscription update application 130 invalidates a given subscription by setting the stale flag of the subscription to true—e.g. (continuing the above example) [SET SID_stale "True" EX n]. This will cause the subscription to be updated the next time the subscription is invoked (e.g. at 430 of process 300 described above). Notably, a "true" stale flag does not necessarily mean the subscription data (i.e. the set of object identifiers stored for the subscription) is actually incorrect—only that it could be.

Where there is a high level of database activity, event detection application 128 may be configured to process relevant events in batches, and/or during particular time windows, in order to reduce load on cache 126. In this case deduplication can be performed so each relevant subscription is only flagged as stale once.

In addition to process 500 (or as alternative to process 500), subscription service 120 may be configured to periodically update subscription records regardless of a 'stale' variable or TTL. This may be done, for example, by causing an update process (such as 432 described above) to be periodically performed for subscriptions that are maintained in cache 126. Application 122 (or an alternative application) may be configured to cause such updates to be performed during periods of low database 106 activity.

To further illustrate the operations described above, the processing two example original SQL queries will be now be described.

In both examples, a database 106 stores the following objects:

| ID | Project | Assignee | Resolution | Status | Permissions |
|---|---|---|---|---|---|
| DEMO-1 | DEMO | Empty | Won't Fix | Done | All |
| DEMO-2 | DEMO | Empty | Unresolved | Done | All |
| DEMO-3 | DEMO | Jane | Unresolved | To Do | All |
| DEMO-4 | DEMO | Matthew | Unresolved | To Do | All |
| DEMO-5 | DEMO | Matthew | Unresolved | Done | All |
| DEMO-6 | DEMO | Matthew | Unresolved | Done | None |
| NOTDEMO-1 | NOTDEMO | Matthew | Unresolved | To Do | All |

The first example is a Jira Query Language (JQL) original query as follows, execution of which has been requested by user 'Matthew'.

| Example original query |
|---|
| Project = DEMO AND<br>assignee = currentUser( ) AND<br>Resolution = Unresolved<br>ORDER BY Status ASC |

Processing according to process 300 described above generates the following sets of caching and non-caching clauses:

| Set of caching clauses |
|---|
| Project = DEMO AND<br>Resolution = Unresolved |

| Set of non-caching clauses |
|---|
| Assignee = currentUser( )<br>ORDER BY Status ASC |

The first stage query is the set of caching clauses. Execution of the first stage SQL query (at 406) returns the following results (an unsorted set):

| Set of first stage query results |
|---|
| {DEMO-2, DEMO-3, DEMO-4, DEMO-5, DEMO-6} |

In this example: DEMO-1 is not returned because the resolution does not match; NOTDEMO-1 is not returned because the project does not match. As permissions are not applied in execution of the first stage query, DEMO-6 is returned.

Generation of the second stage SQL query (at 434) generates a query such as:

| Second stage SQL query |
|---|
| key in (DEMO-2, DEMO-3, DEMO-4, DEMO-5, DEMO-6) AND<br>Assignee = currentUser( ) AND<br>hasPermissionToViewIssue = true<br>ORDER BY Status ASC |

Execution of the second stage query (at 436) returns the following result set (a sorted list):

| Set of second stage query results |
|---|
| [DEMO-5, DEMO-4] |

In this case: DEMO-2 and DEMO-3 have been removed from the set of first stage query results because the assignee was not 'Matthew'; DEMO-6 has been removed because 'Matthew' did not have permission to access that record; the results have been sorted alphabetically according to their statuses. The set of second stage query results can then be used to retrieve any other object (issue) data in respect of the identified objects.

The second example is a SQL original query as follows, execution of which has been requested by user 'Matthew'. Semantically, this example SQL query matches the example JQL query above

| Example original query |
|---|
| SELECT ID FROM issues<br>WHERE<br>    Project = 'DEMO' AND<br>    Assignee = 'Matthew' AND<br>    Resolution = 'Unresolved' AND<br>    Matthew__has__access = true<br>ORDER BY Status; |

Processing according to process 300 described above generates the following sets of caching and non-caching clauses:

| Set of caching clauses |
|---|
| SELECT ID FROM issues<br>WHERE<br>    Project = 'DEMO' AND<br>    Resolution = 'Unresolved'; |

| Set of non-caching clauses |
| --- |
| SELECT ID FROM issues<br>WHERE<br>    Assignee = 'Matthew' AND<br>    Matthew_has_access = true<br>ORDER BY Status; |

The first stage query is the set of caching clauses. As in the JQL example above, execution of the first stage SQL query (at 406) returns the following results (an unsorted set):

| Set of first stage query results |
| --- |
| {DEMO-2, DEMO-3, DEMO-4, DEMO-5, DEMO-6} |

Generation of the second stage SQL query (at 434) generates a query such as:

| Second stage SQL query |
| --- |
| SELECT ID FROM issues<br>WHERE<br>    ID in (DEMO-2, DEMO-3, DEMO-4, DEMO-5, DEMO-6)<br>    Assignee = 'Matthew' AND<br>    Matthew_has_access = true<br>ORDER BY Status; |

As in the JQL example above, execution of the second stage query (at 436) returns the following result set (a sorted list):

| Set of second stage query results |
| --- |
| [DEMO-5, DEMO-4] |

The set of second stage query results can then be used to retrieve any other object (issue) data in respect of the identified objects.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer implemented method comprising:
   receiving a request defining an original structured query language (SQL) query, the original SQL query including a plurality of clauses;
   obtaining a subscription identifier based on the original SQL query;
   identifying a set of cached-type clauses from the plurality of clauses based on a determination that execution of each respective clause included in the set of cached-type clauses does not depend on a time of execution of the respective clause;
   identifying a set of non-caching-type clauses from the plurality of clauses, the set of non-caching-type clauses non-overlapping with the set of cached-type clauses;
   determining if a set of first stage query results corresponding to the set of cached-type clauses associated with the subscription identifier is in a cache;
   in response to determining that the set of first stage query results corresponding to the set of cached-type clauses associated with the subscription identifier is in the cache:
      obtaining the set of first stage query results from the cache;
      obtaining a set of second stage query results from a database using a second stage SQL query, the second stage SQL query including the set of first stage query results obtained from the cache and the set of non-caching-type clauses; and
   returning the set of second stage query results.

2. The computer implemented method of claim 1, further comprising determining a clause of the plurality of clauses is a non-caching type clause in response to determining the clause is a dynamic clause.

3. The computer implemented method of claim 1, further comprising determining a clause of the plurality of clauses is a non-caching type clause in response to determining the clause references a database field having a permission scheme.

4. The computer implemented method of claim 1, wherein obtaining the subscription identifier based on the original SQL query comprises generating a query identifier of the subscription identifier by calculating a hash of the set of cached-type clauses of the plurality of clauses.

5. The computer implemented method of claim 1, wherein the subscription identifier further includes a tenant identifier, the tenant identifier identifying a tenant that is associated with an account that initiated the database request.

6. The computer implemented method of claim 1, wherein the second stage SQL query further includes an ordering clause included in the original SQL query.

7. The computer implemented method of claim 1, further comprising:
   determining a number of records flags associated with the subscription identifier in the cache; and
   in response to determining that the number of records flags associated with the subscription identifier in the cache exceeds a particular threshold, obtaining the second stage query results from the database by executing the original SQL query against the database.

8. The computer implemented method of claim 1, further comprising:

determining whether a stale flag is associated with the subscription identifier in the cache; and in response to determining that the stale flag is associated with the subscription identifier in the cache, triggering an asynchronous update process to update the set of first stage query results in the cache.

9. The computer implemented method of claim 1, further comprising:

determining whether the set of first stage query results has expired; and in response to determining that the set of first stage query results has expired, triggering an asynchronous update process to update the set of first stage query results in the cache.

10. The computer implemented method of claim 1, further comprising generating the set of first stage query results, based on a set of caching clauses that match the set of cached-type clauses of the plurality of clauses, prior to receiving the request for storing in the cache.

11. A computer processing system comprising:

a processing unit;

a communications interface; and a non-transitory computer-readable storage medium storing instructions, which when executed by the processing unit, cause the processing unit to:

receive, via the communications interface, a request defining an original structured query language (SQL) query, the original SQL query including a plurality of clauses;

identify a set of cached-type clauses from the plurality of clauses based on a determination that execution of each respective clause included in the set of cached-type clauses does not depend on a time of execution of the respective clause;

identify a set of non-caching-type clauses from the plurality of clauses, the set of non-caching-type clauses non-overlapping with the set of cached-type clauses;

obtain a subscription identifier based on the original SQL query;

determine if a set of first stage query results corresponding to the set of cached-type clauses associated with the subscription identifier is in a cache;

in response to determining that the set of first stage query results corresponding to the set of cached-type clauses associated with the subscription identifier is in the cache:

obtain the set of first stage query results from the cache using the subscription identifier;

obtain a set of second stage query results from a database using a second stage SQL query, the second stage SQL query including the set of first stage query results obtained from the cache and the set of non-caching-type clauses; and return the set of second stage query results.

12. The computer processing system of claim 11, wherein execution of the instructions further causes the processing unit to determine that a clause of the plurality of clauses is a non-caching-type clause in response to determining the clause is a dynamic clause.

13. The computer processing system of claim 11, wherein execution of the instructions further causes the processing unit to:

determine a number of records flags associated with the subscription identifier in the cache; and in response to determining that the number of records flags associated with the subscription identifier in the cache exceeds a particular threshold, obtain the second stage query results from the database by executing the original SQL query against the database.

14. The computer processing system of claim 11, wherein execution of the instructions further causes the processing unit to:

determine whether a stale flag is associated with the subscription identifier in the cache; and in response to determining that the stale flag is associated with the subscription identifier in the cache, trigger an asynchronous update process to update the set of first stage query results in the cache.

15. The computer processing system of claim 11, wherein execution of the instructions further causes the processing unit to:

determine whether the set of first stage query results has expired; and in response to determining that the set of first stage query results has expired, trigger an asynchronous update process to update the set of first stage query results in the cache.

16. The computer processing system of claim 11, wherein execution of the instructions further causes the processing unit to generate the set of first stage query results, based on a set of caching clauses that match the set of cached-type clauses of the plurality of clauses.

17. The computer implemented method of claim 1, further comprising determining a clause of the plurality of clauses is a non-caching-type clause in response to determining the clause includes a temporal function or the clauses references a filter.

* * * * *